US012626384B2

(12) United States Patent
Sinha et al.

(10) Patent No.: US 12,626,384 B2
(45) Date of Patent: May 12, 2026

(54) DETERMINING INTERVENTIONAL DEVICE SHAPE

(71) Applicant: KONINKLIJKE PHILIPS N.V., Eindhoven (NL)

(72) Inventors: Ayushi Sinha, Baltimore, MD (US); Grzegorz Andrzej Toporek, Cambridge, MA (US); Molly Lara Flexman, Melrose, MA (US); Jochen Kruecker, Andover, MA (US); Ashish Sattyavrat Panse, Burlington, MA (US)

(73) Assignee: Koninklijke Philips N.V., Eindhoven (NL)

( * ) Notice: Subject to any disclaimer, the term of this patent is extended or adjusted under 35 U.S.C. 154(b) by 316 days.

(21) Appl. No.: 18/034,589

(22) PCT Filed: Nov. 16, 2021

(86) PCT No.: PCT/EP2021/081758
§ 371 (c)(1),
(2) Date: Apr. 28, 2023

(87) PCT Pub. No.: WO2022/106377
PCT Pub. Date: May 27, 2022

(65) Prior Publication Data
US 2023/0334686 A1      Oct. 19, 2023

Related U.S. Application Data

(60) Provisional application No. 63/116,184, filed on Nov. 20, 2020.

(51) Int. Cl.
*G06K 9/00* (2022.01)
*G06T 7/564* (2017.01)

(52) U.S. Cl.
CPC .... *G06T 7/564* (2017.01); *G06T 2207/10072* (2013.01); *G06T 2207/10116* (2013.01);
(Continued)

(58) Field of Classification Search
CPC ........... G06T 7/564; G06T 2207/10072; G06T 2207/10116; G06T 2207/20081;
(Continued)

(56) References Cited

U.S. PATENT DOCUMENTS

| | | | | |
|---|---|---|---|---|
| 6,389,104 B1* | 5/2002 | Bani-Hashemi | ....... | A61B 6/466 378/98.12 |
| 7,371,067 B2* | 5/2008 | Anderson | ................. | A61F 2/07 700/98 |

(Continued)

FOREIGN PATENT DOCUMENTS

| | | |
|---|---|---|
| CN | 111798451 A | 10/2020 |
| WO | 2020109255 A1 | 6/2020 |

OTHER PUBLICATIONS

Ren et al., "Adversarial Constraint Learning for Structured Prediction", Arxiv.org, Cornell University Library 201, Olin Library Cornell University Ithaca, NY 14853, May 27, 2018, XP080882812, cited in the application abstract, figures 2, 3.
(Continued)

*Primary Examiner* — Shervin K Nakhjavan

(57) ABSTRACT

A computer-implemented method of providing a neural network for predicting a three-dimensional shape of an interventional device disposed within a vascular region, includes: training (S140) a neural network (140) to predict, from received X-ray image data (120) and received volumetric image data (110), a three-dimensional shape of the interventional device constrained by the vascular region (150). The training includes constraining the adjusting of parameters of the neural network such that the three-dimen-
(Continued)

sional shape of the interventional device predicted by the neural network (150) fits within the three-dimensional shape of the vascular region represented by the received volumetric image data (110).

14 Claims, 5 Drawing Sheets

(52) U.S. Cl.
CPC .............. *G06T 2207/20081* (2013.01); *G06T 2207/20084* (2013.01)

(58) Field of Classification Search
CPC . G06T 2207/20084; G06T 2207/30021; G06T 2207/30101; G06T 7/55
See application file for complete search history.

(56) References Cited

U.S. PATENT DOCUMENTS

| | | | | |
|---|---|---|---|---|
| 7,961,924 | B2 | 6/2011 | Viswanathan | |
| 7,991,105 | B2 | 8/2011 | Mielekamp et al. | |
| 8,073,221 | B2 * | 12/2011 | Kukuk | G06T 7/74 |
| | | | | 600/407 |
| 8,126,241 | B2 * | 2/2012 | Zarkh | G06T 7/32 |
| | | | | 382/294 |
| 8,369,930 | B2 * | 2/2013 | Jenkins | G01R 33/286 |
| | | | | 600/410 |
| 9,424,648 | B2 * | 8/2016 | Tzoumas | G06T 7/74 |
| 9,652,862 | B1 * | 5/2017 | Speidel | G06T 7/344 |
| 10,217,217 | B2 | 2/2019 | Dhruwdas | |
| 10,317,197 | B2 * | 6/2019 | Ramachandran | G01B 21/04 |
| 10,322,000 | B2 * | 6/2019 | Orth | A61B 5/1076 |
| 10,448,837 | B2 * | 10/2019 | Manzke | A61B 1/00045 |
| 10,529,088 | B2 * | 1/2020 | Fine | G06N 3/08 |
| 10,779,889 | B2 * | 9/2020 | Kowarschik | A61B 6/504 |
| 11,547,492 | B2 * | 1/2023 | Hill | A61B 5/721 |
| 12,186,021 | B2 * | 1/2025 | De Beule | A61B 34/10 |
| 12,400,324 | B2 * | 8/2025 | Takahashi | G06V 20/647 |
| 2008/0247621 | A1 | 10/2008 | Zarkh et al. | |
| 2011/0160569 | A1 * | 6/2011 | Cohen | A61B 5/064 |
| | | | | 600/424 |
| 2013/0172732 | A1 * | 7/2013 | Kiraly | A61B 6/12 |
| | | | | 600/424 |
| 2014/0243687 | A1 * | 8/2014 | Ramachandran | A61B 5/6847 |
| | | | | 600/478 |
| 2017/0057169 | A1 * | 3/2017 | Grbic | A61F 2/2415 |
| 2018/0279974 | A1 | 10/2018 | Breininger et al. | |
| 2020/0094074 | A1 | 3/2020 | Chen et al. | |
| 2020/0211240 | A1 | 7/2020 | Bernard | |
| 2021/0022806 | A1 | 1/2021 | Feops | |
| 2023/0082121 | A1 * | 3/2023 | Ambwani | G06V 10/507 |
| | | | | 382/131 |
| 2024/0130796 | A1 * | 4/2024 | Song | A61B 34/20 |
| 2024/0221152 | A1 * | 7/2024 | Kono | G16H 30/40 |

OTHER PUBLICATIONS

Shi et al., "Shape Sensing Techniques for Continuum Robots in Minimally Invasive Surgery: A Survey", IEEE Transactions on Biomedical Engineering, IEEE, USA, vol. 64, No. 8, Aug. 1, 2017, pp. 1665-1678, XP011656270, ISSN: 0018-9292, DOI: 10.1109/TBME.2016.2622361 [retrieved on Jul. 14, 2017], abstract, section IV, table III.

Henzler et al., "Single image tomography:3D volumes from 2D X-rays", Oct. 16, 2017, pp. 1-11.

Ying et al., "X2CT-GAN: Reconstructing CT from Biplanar X-Rays with Generative Adversarial Networks", May 16, 2019, pp. 1-13.

Kayatama et al. (1990). 'Adverse reactions to ionic and nonionic contrast media. A report from the Japanese Committee on the Safety of Contrast Media', Radiology, 175(3): Abstract only, downloaded from https://pubs.rsna.org/doi/abs/10.1148/radiology.175.3.2343107?journalCode=radiology.

International Search report and Written Opinion of PCT/EP2021/081758, dated Mar. 2, 2022.

* cited by examiner

Input layer          Hidden layers          Output layer

S110

↓

S120

↓

S130

↓

S140

↓

S150

↓

S160

S210

↓

S220

↓

S230

↓

S240

↓

S250

210

300

390

DETERMINING INTERVENTIONAL DEVICE SHAPE

CROSS-REFERENCE TO PRIOR APPLICATIONS

This application is the U.S. National Phase application under 35 U.S.C. § 371 of International Application No. PCT/EP2021/081758, filed on Nov. 16, 2021, which claims the benefit of U.S. Provisional Patent Application Ser. No. 63/116,184, filed on Nov. 20, 2020. These applications are hereby incorporated by reference herein.

TECHNICAL FIELD

The present disclosure relates to determining a three-dimensional shape of an interventional device disposed within a vascular region. A computer-implemented method, a processing arrangement, a system, and a computer program product, are disclosed.

BACKGROUND

Many interventional medical procedures are carried out under X-ray imaging. The two-dimensional images provided by X-ray imaging assist physicians to navigate interventional devices such as guidewires and catheters within the anatomy. Dense regions of the anatomy such as bone, and interventional devices, are highly visible under X-ray imaging. However, soft tissue anatomical regions such as the vasculature are often poorly visible under X-ray imaging, hampering navigation. Mentally mapping the shape of interventional devices seen in the two-dimensional X-ray images, to the three-dimensional anatomy, can also be challenging.

By way of an example, in prostatic artery embolization, PAE, interventional devices such as a guidewire and a catheter are navigated through the vasculature under X-ray imaging to a treatment site where microparticles are injected in order to block small blood vessels and thereby inhibit the supply of blood to the prostate. The vasculature is often poorly visible in the X-ray images, and mentally mapping the shape of the interventional devices seen in the X-ray images, to the three-dimensional anatomy, can be challenging.

In order to improve the visibility of the vasculature, two-dimensional intra-procedural digital subtraction angiography, DSA, images are often captured with the use of contrast agents. Some patients may however have adverse reactions to contrast agents, limiting their use. In order to address the challenge of mentally mapping the shape of the interventional device in the X-ray images to the three-dimensional anatomy, a pre-operative three-dimensional image of the vasculature, such as a computed tomography angiography, CTA, image, may be obtained prior to such interventions. The CTA image serves as a roadmap to guide the interventional procedure. In spite of these measures, however, a physician often needs to make multiple two-dimensional X-ray images of the vasculature from different projection angles in order to confirm the position of the interventional device.

Generating multiple two-dimensional X-ray images of the vasculature from different projection angles, also suffers from drawbacks. Aside from the increased radiation dose, a desired projection angle may be unobtainable because certain configurations of the C-arm supporting the X-ray source and detector are inhibited by the position of the patient or the patient table.

Consequently, there remains room to improve the way in which the shape of interventional devices disposed within vascular regions is determined from X-ray images.

SUMMARY

According to a first aspect of the present disclosure, a computer-implemented method of providing a neural network for predicting a three-dimensional shape of an interventional device disposed within a vascular region, is provided. The method includes:

receiving volumetric image data representing a three-dimensional shape of the vascular region;

receiving X-ray image data representing one or more two-dimensional projections of the interventional device within the vascular region;

receiving ground truth interventional device shape data representing a three-dimensional shape of the interventional device within the vascular region corresponding to the one or more two-dimensional projections of the interventional device; and training a neural network to predict, from the received X-ray image data and the received volumetric image data, a three-dimensional shape of the interventional device constrained by the vascular region, by: inputting the received X-ray image data and the received volumetric image data into the neural network, and adjusting parameters of the neural network based on a first loss function representing a difference between a three-dimensional shape of the interventional device predicted by the neural network, and the received ground truth interventional device shape data, and constraining the adjusting such that the three-dimensional shape of the interventional device predicted by the neural network fits within the three-dimensional shape of the vascular region represented by the received volumetric image data.

According to a second aspect of the present disclosure, a computer-implemented method of predicting a three-dimensional shape of an interventional device disposed within a vascular region, is disclosed. The method includes:

receiving volumetric image data representing a three-dimensional shape of the vascular region;

receiving X-ray image data representing a two-dimensional projection of the interventional device within the vascular region; and inputting the received X-ray image data and the received volumetric image data into a neural network trained to predict, from the received X-ray image data and the received volumetric image data, a three-dimensional shape of the interventional device constrained by the vascular region, and in response to the inputting, predicting, from the received X-ray image data and the received volumetric image data, a three-dimensional shape of the interventional device constrained by the vascular region, using the neural network.

Further aspects, features and advantages of the present disclosure will become apparent from the following description of examples, which is made with reference to the accompanying drawings.

DETAILED DESCRIPTION

Figure 1:
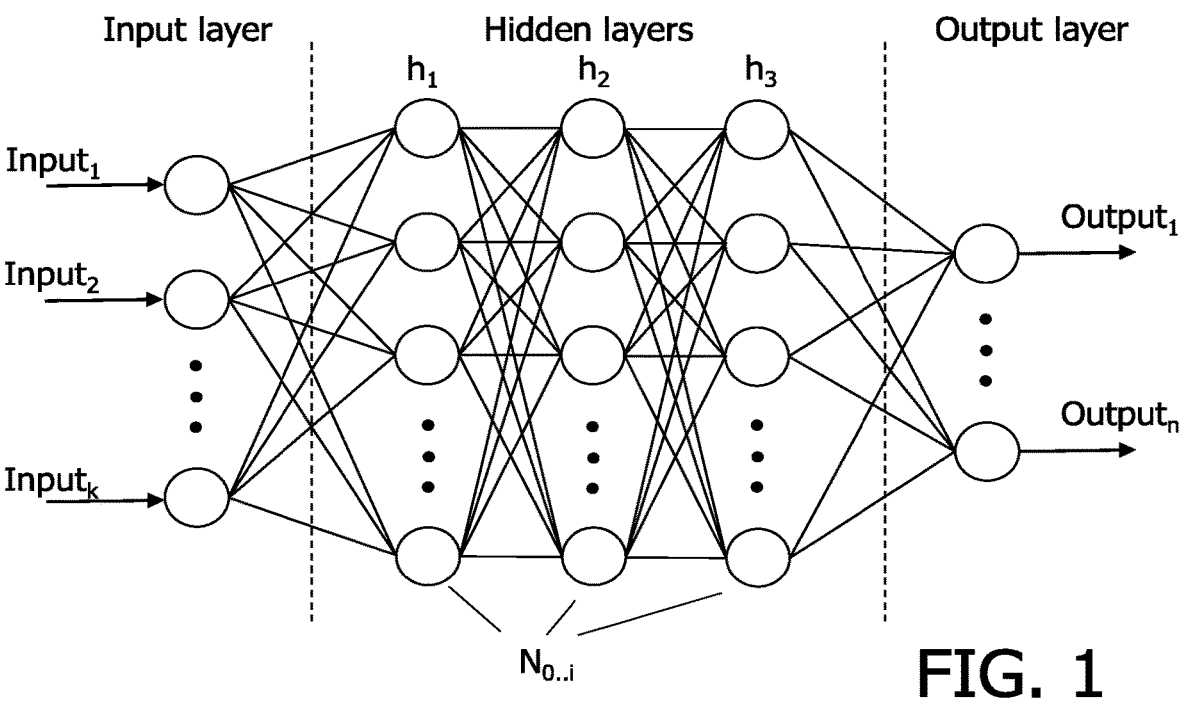
FIG. 1 is a schematic diagram illustrating an example neural network.

Examples of the present disclosure are provided with reference to the following description and the figures. In this description, for the purposes of explanation, numerous specific details of certain examples are set forth. Reference in the specification to "an example", "an implementation" or similar language means that a feature, structure, or characteristic described in connection with the example is included in at least that one example. It is also to be appreciated that features described in relation to one example may also be used in another example, and that all features are not necessarily duplicated in each example for the sake of brevity. For instance, features described in relation to a computer-implemented method may be implemented in a processing arrangement, and in a system, and in a computer program product, in a corresponding manner.

In the following description, reference is made to computer implemented methods that involve predicting a three-dimensional shape of an interventional device disposed within a vascular region. Reference is made to an X-ray imaging procedure wherein an interventional device in the form of a guidewire is disposed within the vasculature. However, it is to be appreciated that examples of the computer implemented methods disclosed herein may be used with other types of interventional devices that may be used within the vasculature than a guidewire, such as, and without limitation: a catheter, an intravascular ultrasound imaging device, an optical coherence tomography device, a catheter with sensing capabilities such as spectral sensing, an introducer sheath, a laser atherectomy device, a mechanical atherectomy device, a blood pressure device and/or flow sensor device, a shape-sensed device, a TEE probe, a needle, a biopsy needle, an ablation device, a balloon, a stent, or an endograft, and so forth.

It is noted that the computer-implemented methods disclosed herein may be provided as a non-transitory computer-readable storage medium including computer-readable instructions stored thereon which, when executed by at least one processor, cause the at least one processor to perform the method. In other words, the computer-implemented methods may be implemented in a computer program product. The computer program product can be provided by dedicated hardware or hardware capable of running the software in association with appropriate software. When provided by a processor, the functions of the method features can be provided by a single dedicated processor, by a single shared processor, or by a plurality of individual processors, some of which can be shared. The explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, examples of the present disclosure can take the form of a computer program product accessible from a computer usable storage medium or a computer-readable storage medium, the computer program product providing program code for use by or in connection with a computer or any instruction execution system. For the purposes of this description, a computer-usable storage medium or computer-readable storage medium can be any apparatus that can comprise, store, communicate, propagate, or transport a program for use by or in connection with an instruction execution system, apparatus, or device. The medium can be an electronic, magnetic, optical, electromagnetic, infrared, or semiconductor system or device or propagation medium. Examples of computer-readable media include semiconductor or solid-state memories, magnetic tape, removable computer disks, random access memory "RAM", read only memory "ROM", rigid magnetic disks, and optical disks. Current examples of optical disks include compact disk-read only memory "CD-ROM", optical disk-read/write "CD-R/W", Blu-Ray™, and DVD.

Reference is also made herein to various neural networks, and the training thereof by automatically adjusting their parameters. FIG. 1 is a schematic diagram illustrating an example neural network. The example neural network in FIG. 1 is a Deep Feed Forward neural network that includes neurons arranged in an Input layer, three Hidden layers $h_1$-$h_3$, and an Output layer. The example neural network in FIG. 1 receives input data in the form of numeric or binary input values at the inputs, $Input_1$-$Input_k$, of neurons in its Input layer, processes the input values by means of the neurons in its Hidden layers, $h_1$-$h_3$, and generates output data at the outputs, $Outputs_{1 \ldots n}$, of neurons in its Output layer. The input data may for instance represent image data, or position data, and so forth. Each neuron in the Input layer represents a portion of the input data, such as for example a pixel of an image.

Figure 2:
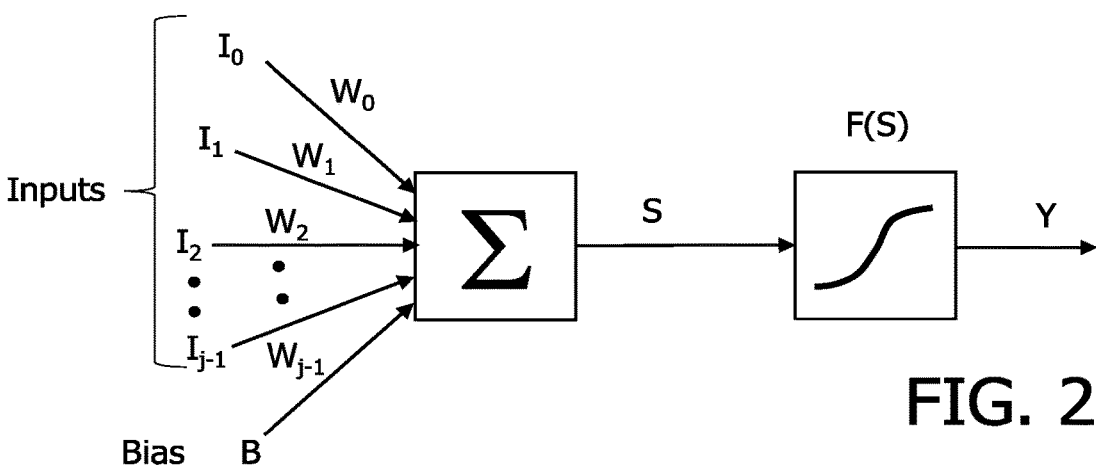
FIG. 2 is a schematic diagram illustrating an example neuron.

FIG. 2 is a schematic diagram illustrating an example neuron. The example neuron illustrated in FIG. 2 may be used to provide the neurons in hidden layers $h_1$-$h_3$ of FIG. 1, as well as the neurons in the output layer of FIG. 1. The example neuron in FIG. 2 includes a summing portion labelled with a sigma symbol, and an activation function labelled F(S) that represents a sigmoid activation function. In operation, data inputs $I_0$-$I_{j-1}$ are multiplied by corresponding weights $w_0$-$w_{j-1}$ and summed together along with a bias term, B. The summed result is inputted into an activation function in order to determine the output of the neuron. The bias term shifts the activation function left or right and implicitly sets a threshold to the neuron's activation, thereby controlling the output of the neuron. The weights determine the strength of the connections between the neurons in the network. The weights, the biases, and the neuron connections are examples of "trainable parameters" of the neural network that are "learnt", or in other words, capable of being trained, during a neural network "training" process. Various activation functions may be used, such as a Sigmoid function, a Tanh function, a step function, Rectified Linear Unit "ReLU", leaky ReLU, Softmax and a Swish function.

As mentioned above, the process of training a neural network includes automatically adjusting the above-described weights and biases. Supervised learning involves providing a neural network with a training dataset that includes input data and corresponding expected output data. The training dataset is representative of the input data that the neural network will likely be used to analyses after training. During supervised learning, the weights and the biases are automatically adjusted such that when presented with the input data, the neural network accurately provides the corresponding expected output data.

Training a neural network typically involves inputting a large training dataset into the neural network, and iteratively adjusting the neural network parameters until the trained neural network provides an accurate output. Training is usually performed using a Graphics Processing Unit "GPU" or a dedicated neural processor such as a Neural Processing Unit "NPU" or a Tensor Processing Unit "TPU". Training therefore typically employs a centralized approach wherein cloud-based or mainframe-based neural processors are used to train a neural network. Following its training with the training dataset, the trained neural network may be deployed to a device for analyzing new input data; a process termed "inference". The processing requirements during inference are significantly less than those required during training, allowing the neural network to be deployed to a variety of systems such as laptop computers, tablets, mobile phones and so forth. Inference may for example be performed by a Central Processing Unit "CPU", a GPU, an NPU, a TPU, on a server, or in the cloud.

As mentioned above, in supervised learning, the weights and the biases are automatically adjusted, such that when presented with the input training data, the neural network accurately provides the corresponding expected output data. The value of a loss function, or error, is computed based on a difference between the predicted output data and the expected output data. The value of the loss function may be computed using functions such as the negative log-likelihood loss, the mean squared error, mean absolute error, the Huber loss, Dice coefficient loss, or the cross entropy loss. During training, the value of the loss function is typically minimized, and training is terminated when the value of the loss function satisfies a stopping criterion. Sometimes, training is terminated when the value of the loss function satisfies one or more of multiple criteria. Various methods are known for solving this minimization problem such as gradient descent, Quasi-Newton methods, and so forth. Various algorithms have been developed to implement these methods and their variants including but not limited to Stochastic Gradient Descent "SGD", batch gradient descent, mini-batch gradient descent, Gauss-Newton, Levenberg Marquardt, Momentum, Adam, Nadam, Adagrad, Adadelta, RMSProp, and Adamax "optimizers".

These algorithms compute the derivative of the loss function with respect to the model parameters using the chain rule. This process is called backpropagation since derivatives are computed starting at the last layer or output layer, moving toward the first layer or input layer. These derivatives inform the algorithm how the model parameters must be adjusted in order to minimize the error function. That is, adjustments to model parameters are made starting from the output layer and working backwards in the network until the input layer is reached. In a first training iteration, the initial weights and biases are often randomized. The neural network then predicts the output data, which is likewise, random. Backpropagation is then used to adjust the weights and the biases. The training process is performed iteratively by making adjustments to the weights and biases in each iteration. Training is terminated when the error, or difference between the predicted output data and the expected output data, is within an acceptable range for the training data, or for some validation data. Subsequently the neural network may be deployed, and the trained neural network makes predictions on new input data using the trained values of its parameters. If the training process was successful, the trained neural network accurately predicts the expected output data from the new input data.

It is to be appreciated that although the above-described training process relates to a Deep Feed Forward neural network, this serves only as an example, and other neural networks may likewise be trained in a similar manner.

Figure 3:
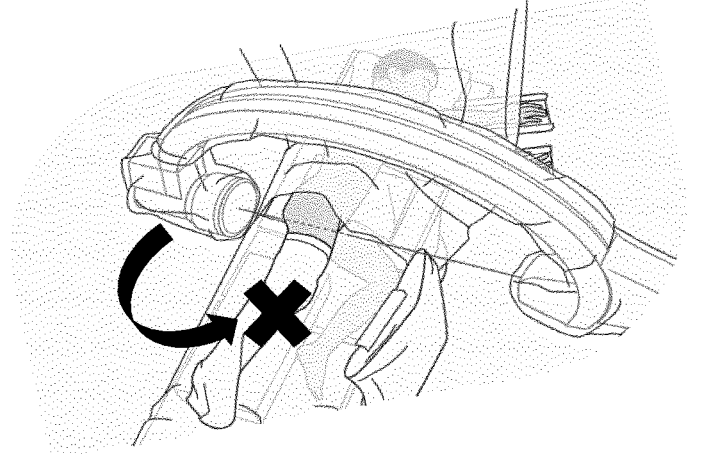
FIG. 3 is a schematic diagram illustrating an example of a desired X-ray imaging view being inhibited during an interventional procedure.

As mentioned above, the poor visibility of soft tissue under X-ray imaging, combined with the two-dimensional nature of X-ray images, confounds the task of mentally mapping X-ray images of interventional devices into the three-dimensional vasculature, and thus navigating interventional devices within the body. A radiologist may consequently make multiple X-ray images of the vasculature from different projection angles. However, obtaining images from the desired projection angle is sometimes confounded by the position of the patient. By way of an example, FIG. 3 is a schematic diagram illustrating an example of a desired X-ray imaging view being inhibited during an interventional procedure. In FIG. 3, the leg of the patient inhibits movement of the C-arm supporting the X-ray imaging source and detector from moving to the desired position and thereby obtaining the desired view. In this situation, a radiologist may subsequently try to image the patient with multiple sub-optimal views, thereby increasing the X-ray dose to the patient. Many similar situations also exist where either the patient, or the patient table, inhibits certain desired X-ray imaging views from being obtained.

Figures 4, 5:
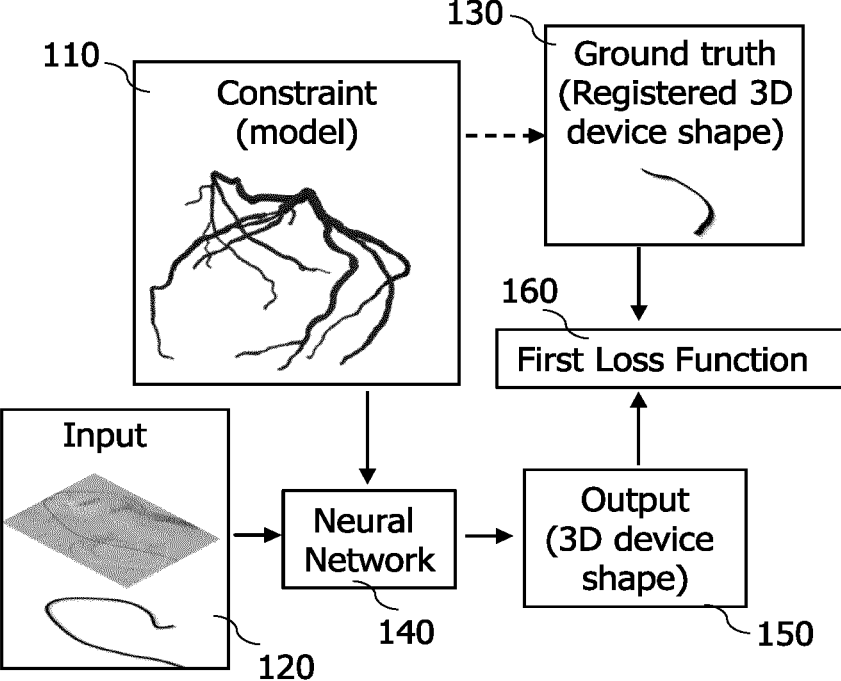
FIG. 4 is a flowchart illustrating a first example of a method of providing a neural network for predicting a three-dimensional shape of an interventional device, in accordance with some aspects of the present disclosure.
FIG. 5 is a schematic diagram illustrating the first example of a method of providing a neural network for predicting a three-dimensional shape of an interventional device, in accordance with some aspects of the present disclosure.

In order to address one or more of the above drawbacks, a method of determining a three-dimensional shape of an interventional device disposed within a vascular region, is provided. The method is described with reference to FIG. 4-FIG. 6. FIG. 4 is a flowchart illustrating a first example of a method of providing a neural network for predicting a three-dimensional shape of an interventional device, in accordance with some aspects of the present disclosure. With reference to FIG. 4, the method includes providing a neural network for predicting a three-dimensional shape of an interventional device disposed within a vascular region, and includes:

receiving S110 volumetric image data 110 representing a
  three-dimensional shape of the vascular region;
 receiving S120 X-ray image data 120 representing one or
  more two-dimensional projections of the interventional
  device within the vascular region;

receiving S130 ground truth interventional device shape data 130 representing a three-dimensional shape of the interventional device within the vascular region corresponding to the one or more two-dimensional projections of the interventional device; and training S140 a neural network 140 to predict, from the received X-ray image data 120 and the received volumetric image data 110, a three-dimensional shape of the interventional device constrained by the vascular region 150, by: inputting S150 the received X-ray image data 120 and the received volumetric image data 110 into the neural network 140, and adjusting S160 parameters of the neural network 140 based on a first loss function 160 representing a difference between a three-dimensional shape of the interventional device predicted by the neural network 150, and the received ground truth interventional device shape data 130, and constraining the adjusting such that the three-dimensional shape of the interventional device predicted by the neural network 150 fits within the three-dimensional shape of the vascular region represented by the received volumetric image data 110.

FIG. 5 is a schematic diagram illustrating the first example of a method of providing a neural network for predicting a three-dimensional shape of an interventional device, in accordance with some aspects of the present disclosure. Various neural networks may serve as neural network 140, including a convolutional neural network, an encoder-decoder network, a generative adversarial network, a capsule network, a regression network, a reinforcement learning agent, Bayesian network, recurrent network. During training operation S140, the neural network 140 receives volumetric image data 110 representing a three-dimensional shape of the vascular region, and X-ray image data 120, and is trained to predict a three-dimensional shape of the interventional device constrained by the vascular region 150. Training may take place in a manner consistent with the methods described above with reference to FIG. 1 and FIG. 2. Training data is provided in the form of ground truth interventional device shape data 130 representing a three-dimensional shape of the interventional device within the vascular region. The value of a first loss function 160 is computed based on the difference between a three-dimensional shape of the interventional device predicted by the neural network 150, and the received ground truth interventional device shape data 130. The value of the first loss function 160 is used to adjust parameters of the neural network 140. The adjusting is also constrained such that the three-dimensional shape of the interventional device predicted by the neural network 150 fits within the three-dimensional shape of the vascular region represented by the received volumetric image data 110. This constraining may be carried out by adjusting the parameters of the neural network 140 using a constraint-based learning technique such as that disclosed in document by Ren, H., et al., 2018, entitled "Adversarial constraint learning for structured prediction", Proc. 27$^{th}$ Int. Joint Conference on Artificial Intelligence, 2637-2643, arXiv:1805.10561v2. Thus, the constraining ensures that the three-dimensional shape of the interventional device predicted by the neural network 150, is a valid shape.

The volumetric image data 110, the X-ray image data 120, and the ground truth interventional device shape data 130, may be received from various sources, including a database, an imaging system, a computer readable storage medium, the cloud, and so forth. The data may be received using any form of data communication, such as wired or wireless data communication, and may be via the internet, an ethernet, or by transferring the data by means of a portable computer-readable storage medium such as a USB memory device, an optical or magnetic disk, and so forth.

The volumetric image data 110 may for example be provided by one or more of:
computed tomography image data;
contrast-enhanced computed tomography image data;
3D ultrasound image data,
cone beam computed tomography image data;
magnetic resonance image data;
anatomical atlas model data; and
reconstructed volumetric image data generated by reconstructing X-ray image data representing one or more two-dimensional projections of the vascular region.

The ground truth interventional device shape data 130 may include one or more of:
computed tomography image data;
contrast-enhanced computed tomography image data;
cone beam computed tomography image data;
fiber optical shape sensing position data generated by a plurality of fiber optic shape sensors mechanically coupled to the interventional device, such as those disclosed in document WO2007/109778 A1;
electromagnetic tracking position data generated by one or more electromagnetic tracking sensors or emitters mechanically coupled to the interventional device, such as those disclosed in document WO 2015/165736 A1;
dielectric mapping position data generated by one or more dielectric sensors mechanically coupled to the interventional device such as those disclosed in document US 2019/254564 A1; and
ultrasound tracking position data generated by one or more ultrasound tracking sensors or emitters mechanically coupled to the interventional device such as disclosed in document WO 2020/030557 A1.

In some examples, the ground truth interventional device shape data 130 may alternatively be provided by a kinematic model of a continuum robotic system.

In some implementations, the coordinate systems of the volumetric image data 110, the X-ray image data 120, and the ground truth interventional device shape data 130 may be registered to one another to facilitate a computation of the first loss function 160 and/or the constraining operation.

When the volumetric image data 110, the X-ray image data 120, or the ground truth interventional device shape data 130 are provided by image data, segmentation techniques may be used to extract the interventional device, and the vasculature, as appropriate. Segmentation techniques such as thresholding, template matching, active contours, applying a region growing algorithm, using a model-based segmentation, manual segmentation, using a neural network based segmentation method, and so forth may be used. The result of the segmentation may be represented as a binary mask, or as spatial coordinates in image space, or as a parametric equation, or as a 2D spline, or as a wireframe model, and so forth. Various suitable segmentation techniques are disclosed in a document by Moccia, S., et al., entitled "Blood vessel segmentation algorithms—Review of methods, datasets and evaluation metrics", Computer Methods and Programs in Biomedicine, Vol. 158, Pages 71-91.

Figure 6:
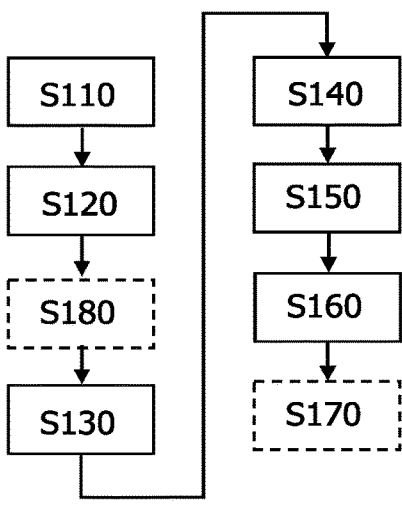
FIG. 6 is a flowchart illustrating the first example of a method of providing a neural network for predicting a three-dimensional shape of an interventional device, and additionally includes optional operations S170 and S180.

FIG. 6 is a flowchart illustrating the first example of a method of providing a neural network for predicting a three-dimensional shape of an interventional device, and additionally includes optional operations S170 and S180. The flowchart illustrated in FIG. 6 corresponds to the flowchart in FIG. 4, and additionally includes operations S170 and S180, which are both independent, and optional, and may also be implemented together.

In operation S170, the method described above with reference to FIG. 4 includes computing S170 an estimated uncertainty of the three-dimensional shape of the interventional device predicted by the neural network 150. In one example, a value representing the uncertainty may be computed by outputting value which is compared with the value of the loss function for the predicted three-dimensional shape of the interventional device. This enables the network to learn features, such as a foreshortened two-dimensional view of the device, that are associated with higher errors in the three-dimensional estimates of the device and, therefore, also with higher uncertainty. In another example, the dropout technique may be used to estimate the uncertainty in the network's predictions. Dropout randomly selects neurons in a neural network and drops their outputs from computation. By repeatedly running inference using dropout, a slightly different predicted output may be obtained at each run. The mean and variance of the predicted outputs can then be computed, with the mean indicating the final output and variance indicating the uncertainty. For example, if the variance is high, then the uncertainty in the network's output is also high. In another example, the neural network may be a Bayesian network which directly predicts a distribution defined by a mean and a variance, and the output three-dimensional shape of the device is a sample from this distribution. In another example, the uncertainty may be computed by processing the neural network's predicted output, for example by calculating distances between points on the three-dimensional shape of the interventional device and the centreline of the shape. Alternatively, the estimated uncertainty may for example be based on a difference between the predicted three-dimensional shape of the interventional device constrained by the vascular region 150, and the volumetric image data 110 representing a three-dimensional shape of the vascular region. The estimated uncertainty may be displayed, for example numerically or as a heatmap indicating a spatial distribution of the computed estimated accuracy.

In operation S180, the method described above with reference to FIG. 4 includes segmenting S180 the received X-ray image data 120 to provide the one or more two-dimensional projections of the interventional device, and inputting S150 the received X-ray image data 120 into the neural network 140 comprises inputting the segmented received X-ray image data into the neural network 140. Various segmentation techniques may be used in this operation, including those mentioned above.

In some implementations, the operation of training S140 the neural network 140 includes constraining the adjusting such that the three-dimensional shape of the interventional device predicted by the neural network 150 satisfies one or more mechanical constraints of the interventional device. The mechanical constraints may for example represent a length of the interventional device in the predicted three-dimensional shape of the interventional device, or a maximum curvature of predicted three-dimensional shape of the interventional device, or a continuity of the predicted three-dimensional shape of the interventional device. These, and other constraints, may be implemented in the adjusting S160 operation by means of one or more additional loss functions, for instance, adding a regularizing component that penalizes the distance between predicted points and the centerline of the shape, or distance of the predicted points to its nearest neighbors, multi-scale loss as deployed in Holistically-Nested Edge Detectors, geodesic loss, or a loss that operates on parametric representation of the shape to promote continuity (e.g. splines), the value(s) of which are also minimized during the training operation S140. The mechanical constraints may for example be provided in the form of a model of the interventional device.

In some implementations, the positions of anatomical features may be used to further constrain the adjusting in operation S160 and thereby improve the accuracy of the predicted three-dimensional shape of the interventional device. For example, if dense bone structures are detectable in the X-ray image data 120, and also in the volumetric image data 110, these may be used to improve the accuracy of the predicted three-dimensional shape of the interventional device. In these implementations, the received volumetric image data 110 further represents a three-dimensional shape of an anatomical feature, the received X-ray image data further 120 represents a two-dimensional projection of the anatomical feature; and the training S140 the neural network 140 further comprises:

training the neural network 140 to predict, from the received X-ray image data 120, a position of the anatomical feature relative to the three-dimensional shape of the interventional device; and constraining the adjusting based on a difference between the predicted position of the anatomical feature relative to the three-dimensional shape of the interventional device, and the position of the anatomical feature relative to the three-dimensional shape of the vascular region in the received volumetric image data 110.

Figure 7:
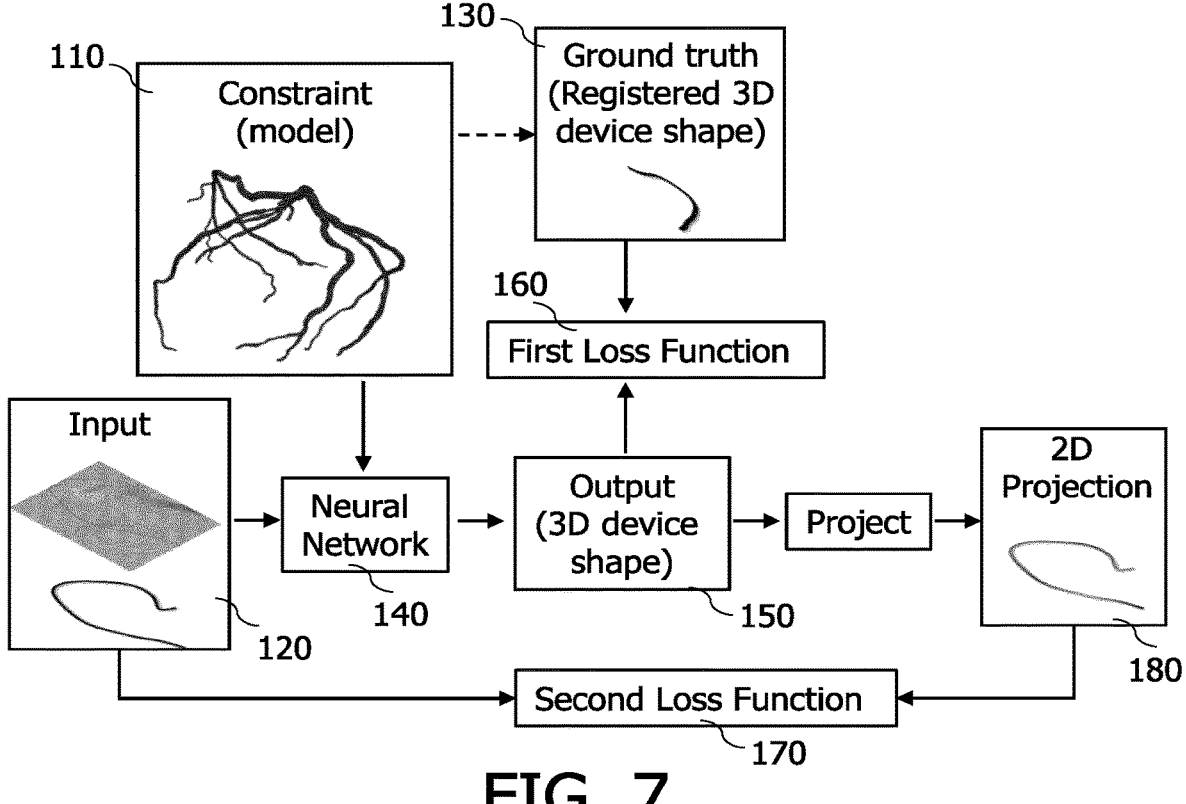
FIG. 7 is a schematic diagram illustrating a second example of a method of predicting a three-dimensional shape of an interventional device, in accordance with some aspects of the present disclosure.

FIG. 7 is a schematic diagram illustrating a second example of a method of predicting a three-dimensional shape of an interventional device, in accordance with some aspects of the present disclosure. The method illustrated in FIG. 7 corresponds to the method of FIG. 5, and additionally includes a projection operation labelled "Project", wherein the three-dimensional shape of the interventional device predicted by the neural network 150, is projected onto a surface, resulting in a "2D projection" 180. The method illustrated in FIG. 7 also includes computing a second loss function 170 based on the difference between the 2D projection 180 and the inputted X-ray image data 120. In the method illustrated in FIG. 7, the value of the second loss function is also used to adjust the parameters of the neural network 140 during training. In more detail the method illustrated in FIG. 7 corresponds to the method of FIG. 4, or FIG. 6, and wherein the adjusting S160 parameters of the neural network 140 is based further on a second loss function 170 representing a difference between a two-dimensional projection 180 of the three-dimensional shape of the interventional device predicted by the neural network 150, and the received X-ray image data 120; the two-dimensional projection 180 of the three-dimensional shape of the interventional device, and the received X-ray image data being projected onto a common surface. This is achieved by projecting the three-dimensional shape of the interventional device predicted by the neural network 150, onto the two-dimensional surface of the X-ray detector that provides X-ray image data 120. Typically this common surface will be planar, or include planar segments, or in some implementations may include a curved surface. In so doing, the second loss function provides an additional constraint for the adjusting of the parameters of the neural network in operation S160. The use of the second loss function in this manner improves the accuracy of the predicted three-dimensional shape of the interventional device.

Aspects of the training method described above may be provided by a processing arrangement comprising one or more processors configured to perform the method. The processing arrangement may for example be a cloud-based processing system or a server-based processing system or a mainframe-based processing system, and in some examples its one or more processors may include one or more neural processors or neural processing units "NPU", one or more CPUs or one or more GPUs. It is also contemplated that the processing system may be provided by a distributed computing system. The processing arrangement may be in communication with one or more non-transitory computer-readable storage media, which collectively store instructions for performing the method, and data associated therewith.

Figures 8, 9:
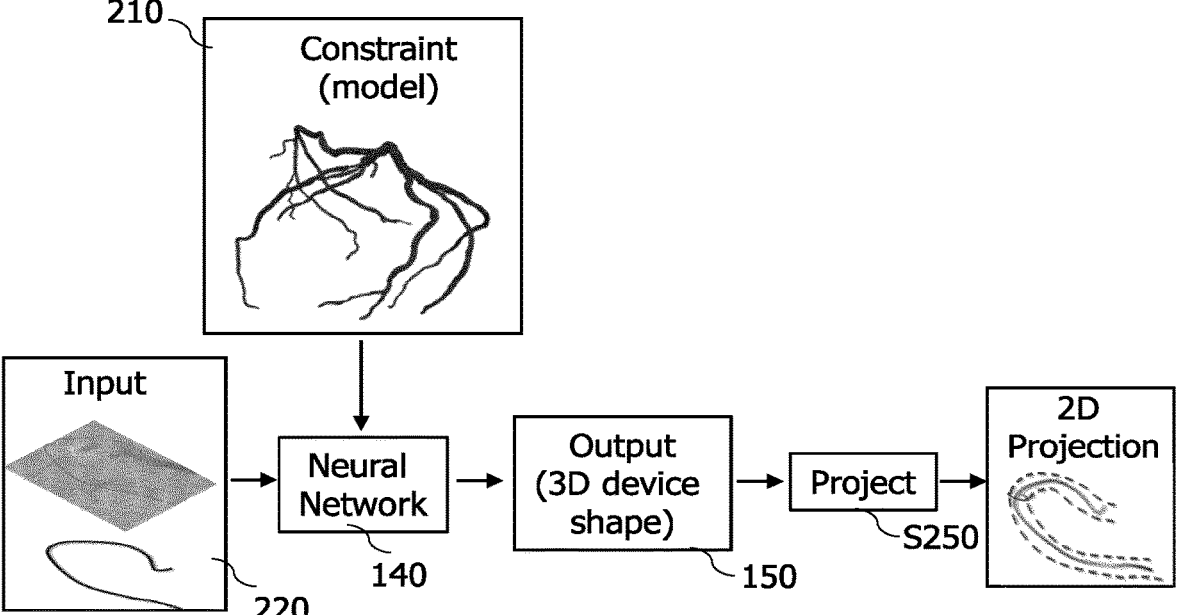
FIG. 8 is a flowchart illustrating an example of a method of predicting a three-dimensional shape of an interventional device, in accordance with some aspects of the present disclosure.
FIG. 9 is a schematic diagram illustrating an example of a method of predicting a three-dimensional shape of an interventional device, in accordance with some aspects of the present disclosure.

The above-described examples of the trained neural network 140 may be used to make predictions on new data during inference. The trained neural network may for example be deployed to a system such as a desktop computer, a laptop computer, a tablet, a mobile phone and so forth. Inference may for example be performed by a Central Processing Unit "CPU", a GPU, an NPU, a TPU, on a server, or in the cloud. FIG. 8 is a flowchart illustrating an example of a method of predicting a three-dimensional shape of an interventional device, in accordance with some aspects of the present disclosure. With reference to FIG. 8, a computer-implemented method of predicting a three-dimensional shape of an interventional device disposed within a vascular region, includes:

receiving S210 volumetric image data 210 representing a three-dimensional shape of the vascular region;

receiving S220 X-ray image data 220 representing a two-dimensional projection of the interventional device within the vascular region; and inputting S230 the received X-ray image data 220 and the received volumetric image data 210 into a neural network 140 trained to predict, from the received X-ray image data 220 and the received volumetric image data 210, a three-dimensional shape of the interventional device constrained by the vascular region 150, and in response to the inputting S230, predicting S240, from the received X-ray image data 220 and the received volumetric image data 210, a three-dimensional shape of the interventional device constrained by the vascular region 150, using the neural network 140.

The predicted three-dimensional shape of the interventional device constrained by the vascular region may be outputted by displaying the predicted three-dimensional shape on a display device, or storing it to a memory device, and so forth.

By providing a three-dimensional shape of the interventional device constrained by the vascular region, according to the above method, improved visualization of the device and vasculature is provided without the need for additional X-ray imaging.

The volumetric image data 210 used by the trained neural network 140 may be provided by any of the above-mentioned sources. For example, in some implementations, the volumetric image data 210 is provided by a pre-operative computed tomography image of the vasculature of the same patient. In some implementations, however, where the vasculature does not exhibit high inter-patient variability, a model of the vascular region, which may originate from a different patient, or a statistical model of the vascular region, which may originate from multiple different patients, may be serve as the volumetric image data 210.

In some implementations, the positions of anatomical features may be used to adjust the parameters of the neural network 140 during inference to improve the accuracy of the predicted three-dimensional shape of the interventional device. In these implementations, the received volumetric image data 210 further represents a three-dimensional shape of an anatomical feature that is visible in X-ray image data, the received X-ray image data further 220 represents a two-dimensional projection of the anatomical feature; and the neural network 140 predicts, from the received X-ray image data 220, a three-dimensional position of the anatomical feature relative to the three-dimensional shape of the interventional device. The parameters of the neural network 140 may be adjusted during inference to improve the accuracy of the predicted three-dimensional shape of the interventional device by constraining the adjusting based on a difference between the predicted position of the anatomical feature relative to the predicted three-dimensional shape of the interventional device, and the position of the anatomical feature relative to the three-dimensional shape of the vascular region in the received volumetric image data 210.

The X-ray image data 220 inputted to the trained neural network 140 may in general be provided by one or more X-ray images. In some implementations, a single X-ray image is provided and the neural network 140 is trained to predict, from one and only one two-dimensional projection of the interventional device within the vascular region, and the received volumetric image data 110, the three-dimensional shape of the interventional device constrained by the vascular region 150. In other implementations, more than one X-ray image may form the basis of the predicted three-dimensional shape of the interventional device constrained by the vascular region. In these implementations, multiple X-ray images acquired over a time interval are provided and the neural network 140 is trained to predict, from multiple two-dimensional projections of the interventional device within the vascular region, and the received volumetric image data 110, multiple three-dimensional shapes of the interventional device constrained by the vascular region 150, corresponding to the multiple shapes of the interventional device in the multiple X-ray images. Multiple two-dimensional projections 180 may be generated from each predicted three-dimensional shape. Various neural networks that can incorporate multiple images or sequences of images as input may serve as neural network 140, including a recurrent neural network, a long short-term memory "LSTM" network, a temporal convolutional network, a transformer, and so forth.

FIG. 9 is a schematic diagram illustrating an example of a method of predicting a three-dimensional shape of an interventional device, in accordance with some aspects of the present disclosure. The schematic diagram of FIG. 9 corresponds to the method of FIG. 8, and additionally includes operation S250, which is illustrated as optional in FIG. 8 by way of the dashed outline. In operation S250, the predicted three-dimensional shape of the interventional device predicted by the neural network 140, is projected onto at least one surface, to provide at least one predicted two-dimensional projection of the interventional device. The surface may for example represent the surface of an X-ray radiation-receiving detector of an X-ray imaging system. The projection may be provided at any desired projection angle. In so doing, a projected image is generated that represents an image that would have been provided by the X-ray imaging system at that projection angle. The surface may be planar or curved, or indeed any desired shape. The predicted two-dimensional projection(s) of the interventional device may be outputted by displaying the projection on a display device, or storing it to a memory device, and so forth.

In some implementations, the predicted two-dimensional projections of the interventional device may include a projection that is a different projection to the projection of the interventional device represented by the received X-ray image data 220. The use of multiple projections that are generated in this manner may be used to provide a "virtual" biplane projection of the interventional device. In some implementations, second, third, fourth, and so on, i.e. multiple projections of the predicted three-dimensional shape of the interventional device may be provided by operation S250, thereby providing virtual multi-plane projections of the interventional device. In some implementations the multiple surfaces may intersect one another. Projections onto multiple intersecting surfaces are often termed "X-plane" images. The generation of projections that are different to the projection of the interventional device represented by the received X-ray image data 220, alleviates the need to take multiple X-ray images at different projection angles. Moreover, it provides a desired projection when a desired projection is unachievable due to the position of the patient, or the patient bed.

In some implementations, a two-dimensional projection of the interventional device is the same projection as the projection of the interventional device represented by the received X-ray image data 220; the two-dimensional projection of the three-dimensional shape of the interventional device, and the received X-ray image data being projected onto a common surface. In these implementations, the second loss function 170 described above with reference to FIG. 7 may be used to adjust the parameters of the neural network 140 during inference to improve the accuracy of the predicted three-dimensional shape of the interventional device.

In some implementations, the volumetric image data 210 used by the neural network 140 may be acquired during an interventional procedure. In these implementations, the three-dimensional volumetric image data may include, in addition to the vascular region of the patient, the three-dimensional shape of the interventional device at the time when the volumetric image is acquired. If the predictions of the neural network are accurate, the three-dimensional shape of the interventional device predicted by the neural network 140, from one or more two-dimensional X-ray images of the interventional device acquired after the acquisition of the volumetric image, should correspond to the three-dimensional shape of the interventional device in the volumetric image. This correspondence may be evaluated by means of one or more additional loss functions, the value(s) of which are also minimized during the training operation S140. The loss functions may measure similarity between known device shape and predicted device shape, or may compare the locations of the known device shape and predicted device shapes in the constraining vascular regions, and so forth. In some implementations, a two-dimensional projection of the three-dimensional shape of the interventional device in the volumetric image may be appended as "Frame 0" to the two-dimensional X-ray images of the interventional device acquired after the acquisition of the volumetric image to create a sequence; the two-dimensional projection of the three-dimensional shape of the interventional device, and the received X-ray image data being projected onto a common surface. The neural network 140 may be trained to predict, from the above-generated sequence and the received volumetric image data, a three-dimensional shape of the interventional device in one of the input X-ray images (e.g., the most recent X-ray image) or multiple three-dimensional shapes of the interventional device corresponding to the multiple shapes of the interventional device in the multiple X-ray images, constrained by the vascular region. In the case where multiple three-dimensional shapes of the interventional device corresponding to the multiple shapes of the interventional device in the multiple X-ray images is predicted, both the first and second loss functions may be used to adjust the parameters of the neural network 140 during inference to improve the accuracy of the predicted three-dimensional shape of the interventional device; the first loss function comparing the known three-dimensional device shape and the three-dimensional device shape predicted from "Frame 0"; the second loss function comparing each two-dimensional projection S250 of the predicted three-dimensional shapes of the interventional device and the inputted two-dimensional X-ray images of the interventional device.

Figure 10:
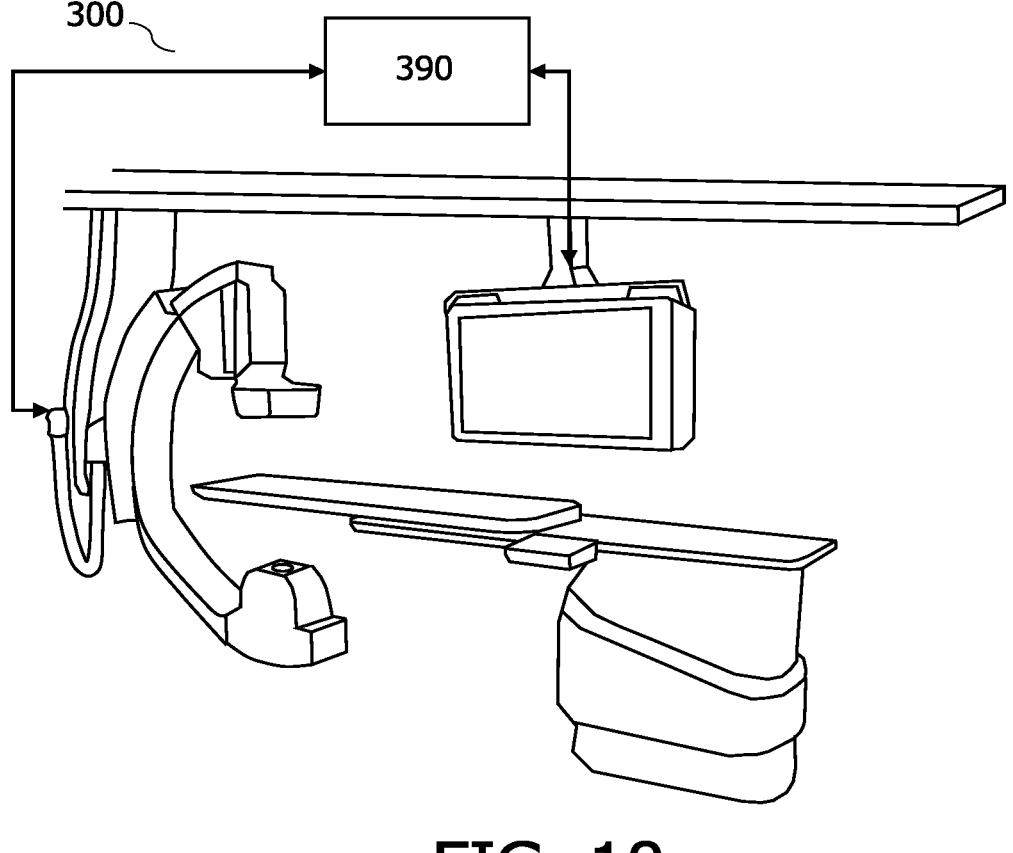
FIG. 10 is a schematic diagram illustrating a system 300 for predicting a three-dimensional shape of an interventional device, in accordance with some aspects of the present disclosure.

A system is also provided for predicting a three-dimensional shape of an interventional device. Thereto, FIG. 10 is a schematic diagram illustrating a system 300 for predicting a three-dimensional shape of an interventional device, in accordance with some aspects of the present disclosure. The system 300 includes one or more processors 390 configured to perform one or more of the operations described above in relation to the computer-implemented inference method. The system may also include an X-ray imaging system, such as the C-arm X-ray imaging system illustrated in FIG. 10, or an X-ray imaging system with another type of support structure to a C-arm, including an O-arm, and a U-shaped arm, and so forth. In-use, the X-ray imaging system may generate X-ray image data 220 representing a two-dimensional projection of the interventional device within the vascular region, which is used as input to the inference method. The system 300 may also include one or more displays as illustrated in FIG. 10, and/or a user interface device such as a keyboard or touchscreen, and a pointing device such as a mouse for controlling the execution of the method, and/or a patient bed.

The above examples are to be understood as illustrative of the present disclosure and not restrictive. Further examples are also contemplated. For instance, the examples described in relation to the computer-implemented method, may also be provided by a computer program product, or by a computer-readable storage medium, or by a processing arrangement, or by the system 300, in a corresponding manner. It is to be understood that a feature described in relation to any one example may be used alone, or in combination with other described features, and may also be used in combination with one or more features of another of the examples, or a combination of other examples. Furthermore, equivalents and modifications not described above may also be employed without departing from the scope of the invention, which is defined in the accompanying claims. In the claims, the word "comprising" does not exclude other elements or operations, and the indefinite article "a" or "an" does not exclude a plurality. The mere fact that certain features are recited in mutually different dependent claims does not indicate that a combination of these features cannot be used to advantage. Any reference signs in the claims should not be construed as limiting their scope.

The invention claimed is:

1. A computer-implemented method of providing a neural network for predicting a three-dimensional shape of an interventional device disposed within a vascular region, the method comprising:

receiving volumetric image data representing a three-dimensional shape of the vascular region;

receiving X-ray image data representing one or more two-dimensional projections of the interventional device within the vascular region;

receiving ground truth interventional device shape data representing a three-dimensional shape of the interventional device within the vascular region corresponding to the one or more two-dimensional projections of the interventional device; and training a neural network to predict, from the received X-ray image data and the received volumetric image data, a three-dimensional shape of the interventional device constrained by the vascular region, by: inputting the received X-ray image data and the received volumetric image data into the neural network, and adjusting parameters of the neural network based on a first loss function representing a difference between a three-dimensional shape of the interventional device predicted by the neural network, and the received ground truth interventional device shape data, and constraining the adjusting such that the three-dimensional shape of the interventional device predicted by the neural network fits within the three-dimensional shape of the vascular region represented by the received volumetric image data.

2. The computer-implemented method according to claim 1, wherein the adjusting parameters of the neural network is based further on a second loss function representing a difference between a two-dimensional projection of the three-dimensional shape of the interventional device predicted by the neural network, and the received X-ray image data; the two-dimensional projection of the three-dimensional shape of the interventional device, and the received X-ray image data being projected onto a common surface.

3. The computer-implemented method according to claim 1, further comprising computing an estimated uncertainty of the three-dimensional shape of the interventional device predicted by the neural network.

4. The computer-implemented method according to claim 1, wherein the volumetric image data comprises one or more of:

computed tomography image data;
contrast-enhanced computed tomography image data;
3D ultrasound image data;
cone beam computed tomography image data;
magnetic resonance image data;
anatomical atlas model data; and
reconstructed volumetric image data generated by reconstructing X-ray image data representing one or more two-dimensional projections of the vascular region.

5. The computer-implemented method according to claim 1, comprising: segmenting the received X-ray image data to provide the one or more two-dimensional projections of the interventional device, and wherein the inputting the received X-ray image data into the neural network comprises inputting the segmented received X-ray image data into the neural network.

6. The computer-implemented method according to claim 1, wherein the ground truth interventional device shape data comprises one or more of:

computed tomography image data;
contrast-enhanced computed tomography image data;
cone beam computed tomography image data;
fiber optical shape sensing position data generated by a plurality of fiber optic shape sensors mechanically coupled to the interventional device;

electromagnetic tracking position data generated by one or more electromagnetic tracking sensors or emitters mechanically coupled to the interventional device;

dielectric mapping position data generated by one or more dielectric sensors mechanically coupled to the interventional device; and ultrasound tracking position data generated by one or more ultrasound tracking sensors or emitters mechanically coupled to the interventional device.

7. The computer-implemented method according to claim 1, wherein the training the neural network comprises constraining the adjusting such that the three-dimensional shape of the interventional device predicted by the neural network satisfies one or more mechanical constraints of the interventional device.

8. The computer-implemented method according to claim 1, wherein the neural network comprises one or more of: a convolutional neural network, an encoder-decoder network, a generative adversarial network, a capsule network, a regression network, a reinforcement learning agent, a recurrent neural network, a long short-term memory network, a temporal convolutional network, and a transformer.

9. The computer-implemented method according to claim 1, wherein the received volumetric image data further represents a three-dimensional shape of an anatomical feature, wherein the received X-ray image data further represents a two-dimensional projection of the anatomical feature; and wherein the training the neural network further comprises training the neural network to predict, from the received X-ray image data, a position of the anatomical feature relative to the three-dimensional shape of the interventional device, and further comprising constraining the adjusting based on a difference between the predicted position of the anatomical feature relative to the three-dimensional shape of the interventional device, and the position of the anatomical feature relative to the three-dimensional shape of the vascular region in the received volumetric image data.

10. A computer-implemented method of predicting a three-dimensional shape of an interventional device disposed within a vascular region, the method comprising:

receiving volumetric image data representing a three-dimensional shape of the vascular region;

receiving X-ray image data representing one or more two-dimensional projections of the interventional device within the vascular region; and predicting, from the received X-ray image data and the received volumetric image data, a three-dimensional shape of the interventional device constrained by the vascular region;

wherein a neural network is trained to predict, from one and only one two-dimensional projection of the interventional device within the vascular region, and the received volumetric image data, the three-dimensional shape of the interventional device constrained by the vascular region.

11. The computer-implemented method according to claim 10, further comprising projecting the predicted three-dimensional shape of the interventional device, onto at least one surface, to provide a at least one predicted two-dimensional projection of the interventional device.

12. The computer-implemented method according to claim 11, wherein the projecting comprises projecting the predicted three-dimensional shape of the interventional device onto a plurality of intersecting surfaces.

13. A system for predicting a three-dimensional shape of an interventional device disposed within a vascular region;

the system comprising one or more processors configured to perform the method according to claim 10.

14. A non-transitory computer-readable storage medium having stored a computer program comprising instructions which, when executed by a processor, cause the processor to:

receive volumetric image data representing a three-dimensional shape of the vascular region; receive X-ray image data representing one or more two-dimensional projections of the interventional device within the vascular region; and predict, from the received X-ray image data and the received volumetric image data, a three-dimensional shape of the interventional device constrained by the vascular region;

wherein a neural network is trained to predict, from one and only one two-dimensional projection of the interventional device within the vascular region, and the received volumetric image data, the three-dimensional shape of the interventional device constrained by the vascular region.

* * * * *